United States Patent
Gao et al.

(10) Patent No.: US 11,816,586 B2
(45) Date of Patent: Nov. 14, 2023

(54) EVENT IDENTIFICATION THROUGH MACHINE LEARNING

(71) Applicant: International Business Machines Corporation, Armonk, NY (US)

(72) Inventors: Xue Feng Gao, Beijing (CN); Hui Qing Shi, Beijing (CN); James C. Thorburn, Toronto (CA); Yu Fen Yuan, Beijing (CN); Qing Feng Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 15/811,573

(22) Filed: Nov. 13, 2017

(65) Prior Publication Data

US 2019/0147354 A1    May 16, 2019

(51) Int. Cl.
  *G06N 5/045* (2023.01)
  *G06N 20/00* (2019.01)
  *G06N 7/01* (2023.01)

(52) U.S. Cl.
  CPC .............. *G06N 5/045* (2013.01); *G06N 7/01* (2023.01); *G06N 20/00* (2019.01)

(58) Field of Classification Search
  CPC ......... G06N 5/045; G06N 7/005; G06N 20/00
  See application file for complete search history.

(56) References Cited

U.S. PATENT DOCUMENTS

| | | | |
|---|---|---|---|
| 6,366,926 B1 | 4/2002 | Pohlmann et al. | |
| 7,818,224 B2 * | 10/2010 | Boerner | G06F 17/18 705/37 |
| 9,032,069 B2 * | 5/2015 | Van Biljon | G06Q 40/00 709/224 |
| 9,047,348 B2 | 6/2015 | Dayan | |
| 2007/0022020 A1 * | 1/2007 | Bernstein | G06Q 30/06 705/26.1 |

(Continued)

FOREIGN PATENT DOCUMENTS

CN          103235823 A      8/2013

OTHER PUBLICATIONS

Nowozin, Improved Information Gain Estimates for Decision Tree Induction (Year: 2012).*

(Continued)

*Primary Examiner* — Abdullah Al Kawsar
*Assistant Examiner* — Tewodros E Mengistu
(74) *Attorney, Agent, or Firm* — Peter Suchecki

(57) ABSTRACT

A method for event identification including receiving event information pertaining to events occurring with respect to a computing environment, each event having a measurement metric; evaluating by a probability function the measurement metric for each event to determine when the measurement metric is above a predetermined probability threshold or below a probability threshold wherein above a probability threshold or below a probability threshold is classified as alarm data; processing the alarm data through a decision tree to determine based on historical data when the alarm data is significant or when the alarm data is not significant and to reduce the number of alarm data to a predetermined number of significant alarm data; and displaying the predetermined number of significant alarm data to a user.

17 Claims, 8 Drawing Sheets

(56) References Cited

U.S. PATENT DOCUMENTS

| | | | |
|---|---|---|---|
| 2011/0131316 A1 | 6/2011 | Ferris et al. | |
| 2011/0320388 A1* | 12/2011 | Wong | G05B 23/0232 706/12 |
| 2013/0305357 A1* | 11/2013 | Ayyagari | H04W 12/06 726/22 |
| 2015/0205856 A1* | 7/2015 | Brill | G06Q 30/0201 707/737 |
| 2015/0333998 A1* | 11/2015 | Gopalakrishnan | H04L 43/08 370/244 |
| 2016/0253078 A1 | 9/2016 | Ebtekar et al. | |
| 2017/0063889 A1* | 3/2017 | Muddu | G06N 7/005 |
| 2017/0103119 A1 | 4/2017 | Tee et al. | |
| 2018/0101639 A1* | 4/2018 | Nanda | G06F 30/20 |
| 2018/0150758 A1* | 5/2018 | Niininen | G06N 20/00 |

OTHER PUBLICATIONS

"Event Correlation", [online], Retrieved from the Internet <URL: https://www.splunk.com/web_assets/pdfs/secure/Splunk_Event_Correlation_Tech_Brief.pdf>, Oct. 27, 2014, all pages.

"Time Series Clustering and Classification", [online], [retrieved on Jul. 13, 2017], Retrieved from the Internet <URL: http://www.rdatamining.com/examples/time-series-clustering-classification>, all pages.

Seyed Behzad Lajevardi et al., "Combination of Time Series, Decision Tree and Clustering: A Case Study in Aerology Event Prediction", [online], Computer and Electrical Engineering, 2008. ICCEE 2008. International Conference, Dec. 20-22, 2008, Retrieved from the Internetl <URL: http://ieeexplore.ieee.org/document/4740957/>, all pages.

* cited by examiner

LAST 14 DAYS

| DATE | MEASUREMENT | CHANGE | STREAK | TREND |
|---|---|---|---|---|
| 2017-09-29 | 162 | | | |
| 2017-09-30 | 202 | 55 | | |
| 2017-10-01 | 183 | 40 | | |
| 2017-10-02 | 106 | -19 | | |
| 2017-10-03 | 157 | -17 | | |
| 2017-10-04 | 233 | 51 | | ▽ |
| 2017-10-05 | 206 | 76 | | |
| 2017-10-06 | 99 | -27 | | |
| 2017-10-07 | 137 | -107 | | |
| 2017-10-08 | 177 | 38 | | |
| 2017-10-09 | 89 | 40 | | |
| 2017-10-10 | 84 | -88 | | |
| 2017-10-11 | 122 | -5 | △ | |
| 2017-10-12 | 1,107 | 38 | △ | |
| | | 985 | | |

FIG. 6

EVENT IDENTIFICATION THROUGH MACHINE LEARNING

BACKGROUND

The present exemplary embodiments pertain to computing systems and, more particularly, pertain to collection and analysis of system events to intelligently identify system events that trigger an alarm and which can be categorized as significant or not significant.

As more system environments emerge, complex infrastructure makes the events generated by network, storage, servers, and applications become a large number. Most of the event management application can trigger an alarm based on pre-defined parameters. But a lot of the alarms are not significant enough to let users (system administrators, managers, end users, etc.) focus on them.

Humans who manage these complex environments have a finite amount of time and attention, and are at high risk of being overloaded with alarms and reports from each individual component of their environment because these alarms and reports are uncorrelated, typically use fixed thresholds that must be constantly adjusted, for example, in a cloud environment as the cloud environment shrinks and grows, and provide their information in many different forms and venues such as email, dashboards, reports, etc.

Moreover, users have to proactively visit dashboard websites to look for problems. When users are sent regular reports with no filtering, the users have no way to know if the report contains something bad or good. Reports and dashboards that usually show "everything is okay" cause "dashboard fatigue"—a condition in which the user gets tired of checking and eventually forgets or doesn't bother, because usually "everything is okay".

BRIEF SUMMARY

The various advantages and purposes of the exemplary embodiments as described above and hereafter are achieved by providing, according to an aspect of the exemplary embodiments, a method for event identification comprising: receiving event information pertaining to events occurring with respect to a computing environment, each event having a measurement metric, the measurement metric for each event including a value attribute, a change attribute, a streak size attribute and a streak duration attribute wherein the value attribute is the original series of measurement data over one or more measurement periods, the change attribute is the change of value at a current measurement period relative to a previous measurement period, the streak size attribute is the size of continuous change in one direction as positive, negative or flat and the streak duration attribute is the number of measurement periods of continuous change in one direction as positive, negative or flat; evaluating by a probability function the measurement metric for each event to determine when any of the value attribute, the change attribute, the streak size attribute and the streak duration attribute is above a predetermined probability threshold or below a probability threshold wherein above a probability threshold or below a probability threshold is classified as alarm data; processing the alarm data through a decision tree to determine based on historical data when the alarm data is significant or when the alarm data is not significant and to reduce the number of alarm data to a predetermined number of significant alarm data; and displaying the predetermined number of significant alarm data to a user.

According to another aspect of the exemplary embodiments, there is provided a computer program product for event identification, the computer program product comprising a computer readable storage medium having program instructions embodied therewith, the program instructions executable by a processor to cause the processor to perform a method comprising: receiving event information pertaining to events occurring with respect to a computing environment, each event having a measurement metric, the measurement metric for each event including a value attribute, a change attribute, a streak size attribute and a streak duration attribute wherein the value attribute is the original series of measurement data over one or more measurement periods, the change attribute is the change of value at a current measurement period relative to a previous measurement period, the streak size attribute is the size of continuous change in one direction as positive, negative or flat and the streak duration attribute is the number of measurement periods of continuous change in one direction as positive, negative or flat; evaluating by a probability function the measurement metric for each event to determine when any of the value attribute, the change attribute, the streak size attribute and the streak duration attribute is above a predetermined probability threshold or below a probability threshold wherein above a probability threshold or below a probability threshold is classified as alarm data; processing the alarm data through a decision tree to determine based on historical data when the alarm data is significant or when the alarm data is not significant and to reduce the number of alarm data to a predetermined number of significant alarm data; and displaying the predetermined number of significant alarm data to a user.

According to a further aspect of the exemplary embodiments, there is provided a system for event identification comprising: an event identification module; a decision tree manager; a non-transitory storage medium that stores instructions; and a processor that executes the instructions to perform the following functions: receive by the event identification module event information pertaining to events occurring with respect to a computing environment, each event having a measurement metric, the measurement metric for each event including a value attribute, a change attribute, a streak size attribute and a streak duration attribute wherein the value attribute is the original series of measurement data over one or more measurement periods, the change attribute is the change of value at a current measurement period relative to a previous measurement period, the streak size attribute is the size of continuous change in one direction as positive, negative or flat and the streak duration attribute is the number of measurement periods of continuous change in one direction as positive, negative or flat; evaluate by a probability function in the event identification module the measurement metric for each event to determine when any of the value attribute, the change attribute, the streak size attribute and the streak duration attribute is above a predetermined probability threshold or below a probability threshold wherein above a probability threshold or below a probability threshold is classified as alarm data; process the alarm data through a decision tree to determine based on historical data when the alarm data is significant or when the alarm data is not significant and to reduce the number of alarm data to a predetermined number of significant alarm data; and display the predetermined number of significant alarm data to a user.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 6 depicts a table of attribute values on a daily basis for a security scan.

DETAILED DESCRIPTION

Figure 1:
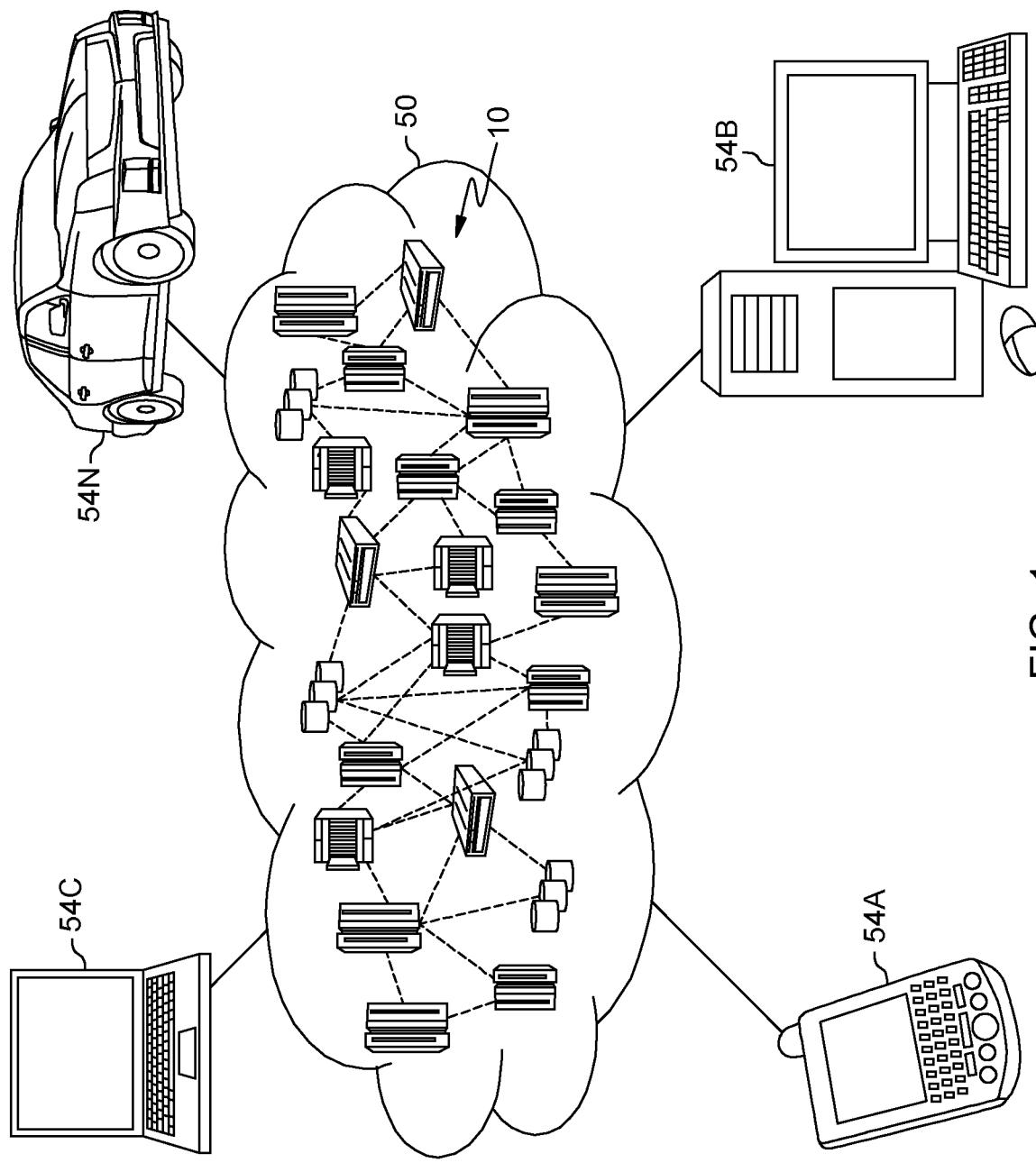
FIG. 1 depicts a cloud computing environment according to an exemplary embodiment of the present invention.

It is proposed in the exemplary embodiments to intelligently identify significant events based on time series data and a self-learning mechanism to optimize a decision tree as an event filter to distinguish events that are significant versus those events that are not significant.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
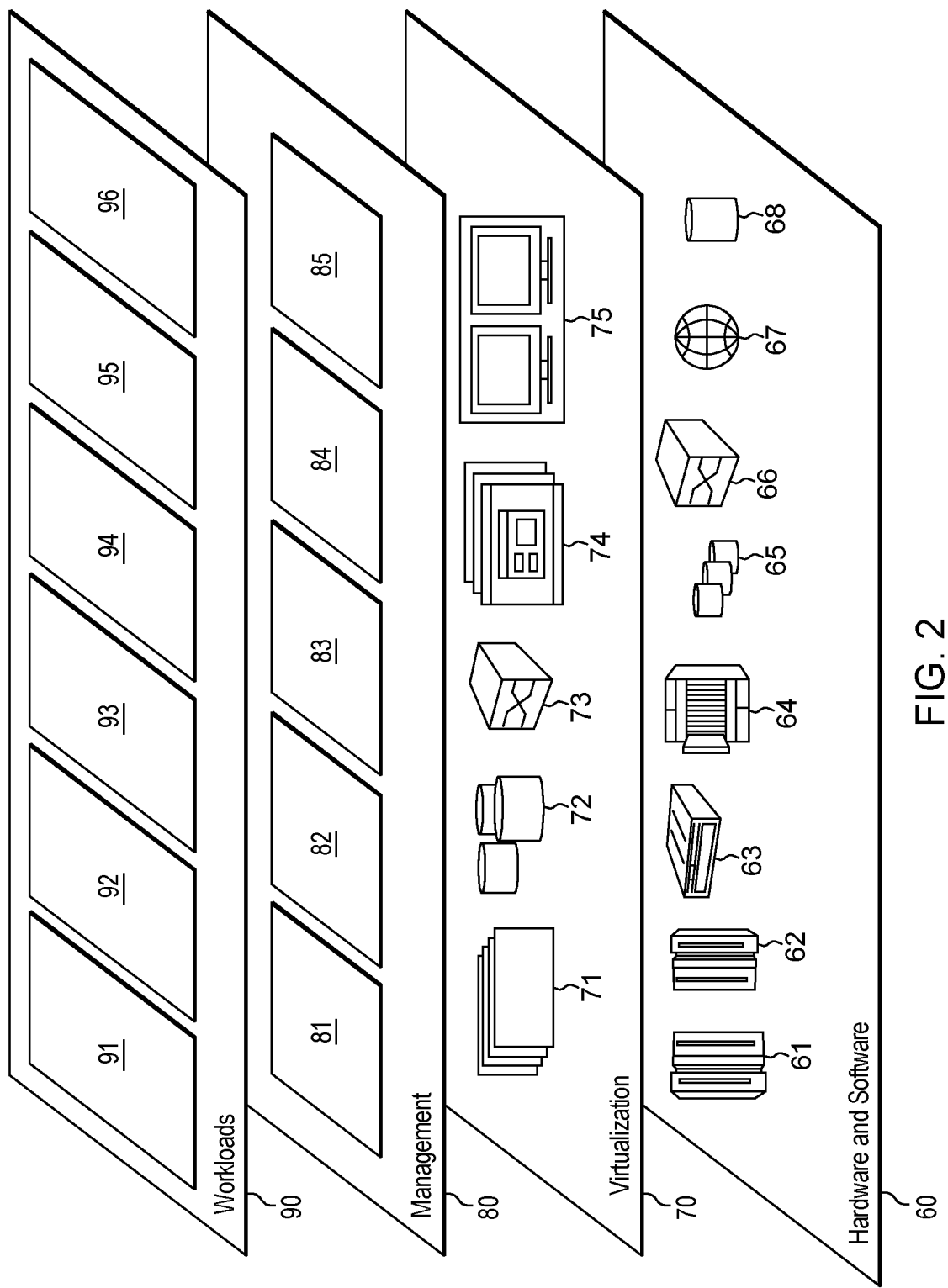
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event identification 96.

Figure 3:
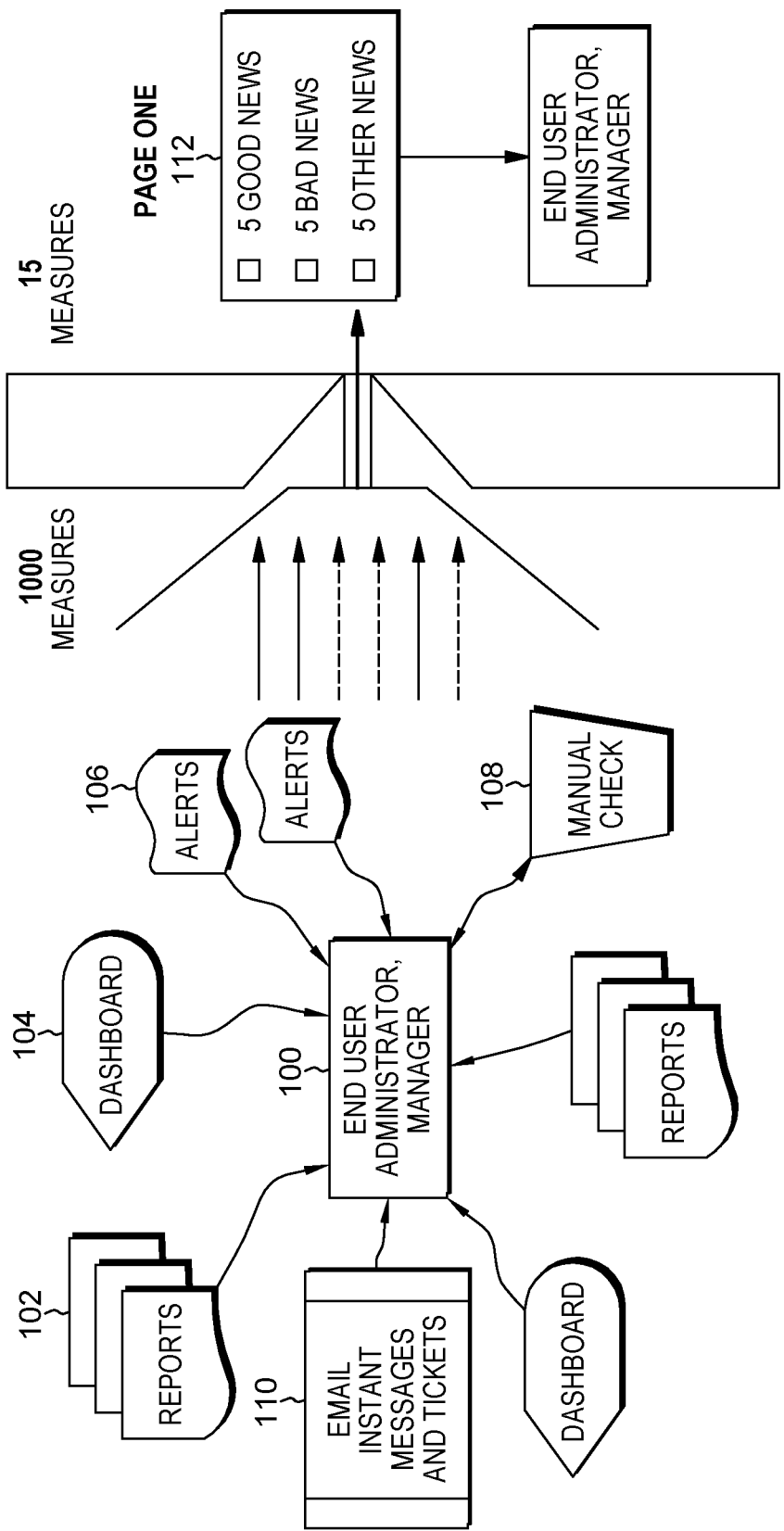
FIG. 3 depicts an overview of an exemplary embodiment.

Referring now to FIG. 3, there is illustrated an overview of an exemplary embodiment. In a computing environment, a user 100 such as an end user, system administrator or manager may receive event information from many different sources. These sources, for example, may be reports 102, a dashboard 104, alerts 106, a manual check 108 and email, instant messages and trouble tickets 110. For purposes of illustration and not limitation, there may be 1000 event identifications each day, many of which are alarms. Of the alarms, is the event significant enough such that the user should focus on it or may the alarm be ignored?

Some examples of measurements that may cause event identifications may be (1) network I/O—amount of network traffic in and out of a given computing system; (2) allocated RAM—amount of RAM allocated to a computing system; (3) number of active virtual machines (VMs)—number of active VMs for a given customer or in the total cloud; (4) number of failed log-in attempts for a given computing system; (5) number of computing system crashes for a given computing system.

The present inventors propose to reduce the number of event identifications displayed to the user down to a much lower number. For purposes of illustration and not limitation, the number illustrated in FIG. 3 is fifteen event identifications reduced down from 1000 event identifications. It is further proposed that the event identifications be presented to a user in a single page format called a "page one" format 112. The page one format 112 may include a certain number of so-called "good news" items, a certain number of so-called "bad news" items and a certain number of "other news" items. For purposes of illustration and not limitation, the page one format 112 illustrated in FIG. 3 has 5 good news items, 5 bad news items and 5 other news items. Other amounts and combinations of good news items, bad news items and other news items may be presented in the page one format 112 within the scope of the exemplary embodiments. The meanings of good news items, bad news items and other news items will be described below.

Figure 4:
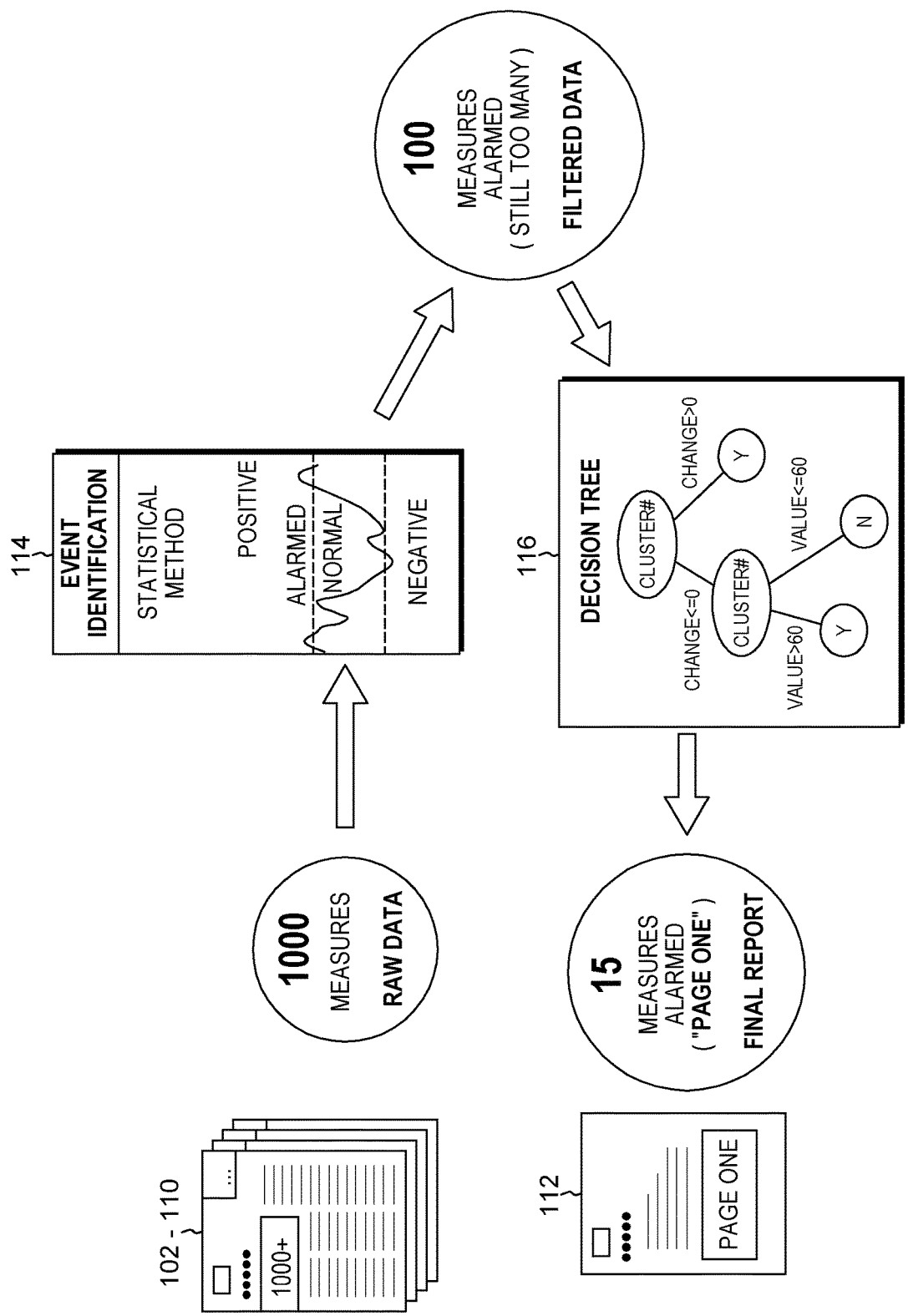
FIG. 4 depicts a more detailed view of the exemplary embodiment of FIG. 3.

Referring now to FIG. 4, more detail is provided with respect to the exemplary embodiment of FIG. 3. The data sources 102-110 described in FIG. 3 may provide 1000 event identifications, also referred to hereafter as measures, in a given period of time. These event identifications are raw data in that the event identifications may be routine measurements of the performance of the computing environment or the event identifications may be alarmed data in that the measurements of the performance of the computing environment may have exceeded some threshold indicating a potential problem with the computing environment.

The raw data may be passed through an event identification module 114 which may include a mean function and a standard deviation function. One example of a statistical tool having these characteristics is an inverse cumulative distribution function (INCDF). Other statistical methods that could detect alarms include Interquartile Range, Grubb's Test, Tietjen-Moore Test and Extreme Studentized Deviate. The event identification module 114 is a statistical tool that evaluates the probability that a particular measurement was seen given the historical distribution of this measurement. Data are alarming when a measurement exceeds the threshold of expectation defined by the measurement's historical distribution and a pre-defined probability threshold using the INCDF (or similar tool).

After passing through the events identification module 114, there may be, for example, 100 event identifications that are alarming. The 100 event identifications constitute filtered data. That is, the 100 event identifications may have exceeded a probability threshold of the INCDF and thus each of these 100 event identifications may have triggered an alarm. On a daily basis, this is still too many alarmed measures.

Accordingly, the filtered data is passed through a decision tree 116 to sort out which measurements are significant, i.e., those measurements that are news, and which measurements are not significant, i.e., those measurements that are not news. After passing through the decision tree 116, there are now 15 measures which make up the page one format 112.

Meta data about each measurement defines the disposition of the user to positive and negative values and changes. The dispositions by the user could be good, bad or neither—all of which may be significant and all of which may be news. For example, positive change in the number of active virtual machines (VMs) in a cloud environment could be described as "good" and negative change in the number of active VMs as "bad". Change (positive or negative) to Network 10, however, could be described as "neither". Thus, a newsworthy (extreme) amount of Network 10 on a given day could be presented as news in Page One, but the characterization may be "other"-meaning, neither good nor bad. A familiar example of other news from the stock market is the volume of trading on a given stock. While price changes may be considered good or bad, an extreme amount of volume of trading may be newsworthy, but may be neither good nor bad.

Figure 5:
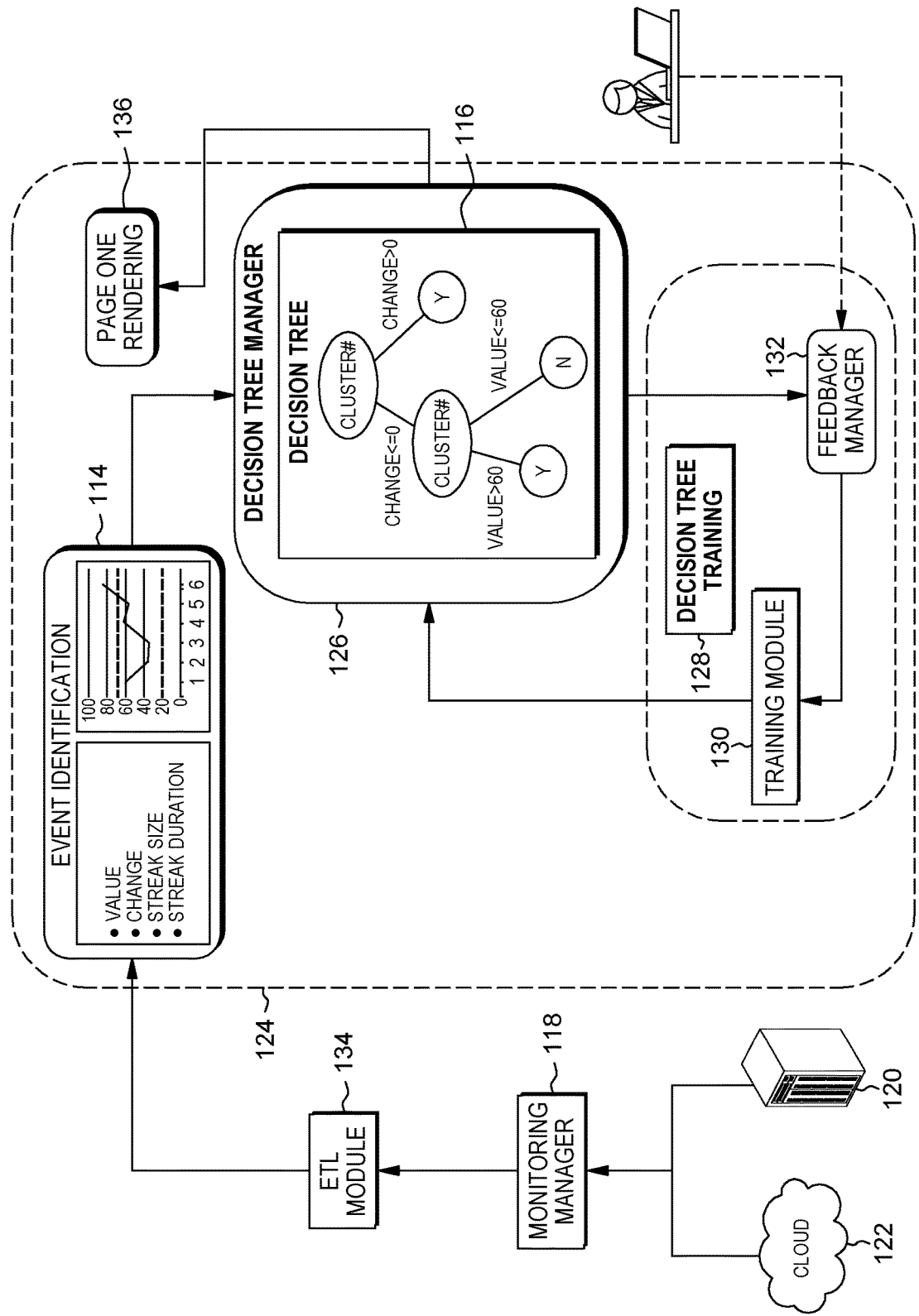
FIG. 5 depicts a more detailed view of the exemplary embodiment of FIGS. 3 and 4.

Referring now to FIG. 5, further details of the exemplary embodiment of FIGS. 3 and 4 are illustrated. A monitoring manager 118 may perform abstraction of event related data from a computing environment. Two such computing environments are illustrated in FIG. 5. One computing environment may be a computing device 120 such as a work station, mainframe, laptop, smart phone or other similar kinds of computing devices. Another computing environment may be a cloud computing environment 122.

The event related data may be passed to an extract, transform, load (ETL) module 134 which transfers the event related data into the exemplary embodiment 124. The exemplary embodiment may include the event identification module 114, a decision tree manager 126 having a decision tree 116 and decision tree training 128 which may include a training module 130 and a feedback manager 132.

The event identification module 114, briefly described in FIG. 4, may receive the event related data from the ETL module 134. The event related data is preferably time series data which is data that is taken over a defined measurement period of time such as hourly or daily. The event related data consists of measurements that may be taken throughout the measuring period. Each measurement may consist of four attributes, namely, value, change, streak size and streak duration.

The value attribute is the original series of measurement data during one or more measurement periods. The event identification module reviews the value attribute to see if any of the values of the measurement data are abnormally high or low.

The change attribute is the change of value at the current measurement period (hour/day) relative to the previous measurement period, which may an immediately preceding measurement period. The event identification module 114 reviews the change attribute to see if any of the values of the measurement data change an abnormal amount in an X number of measurement periods.

The streak size attribute is the aggregate magnitude of changes in one direction over consecutive measurement periods of the streak's duration. The event identification module 114 reviews the streak size attribute to see if any values of the measurement data have changed in an abnormally consistent way, producing an abnormal amount of change (streak impact).

The streak duration attribute is the number of consecutive measurement periods (for example days in one exemplary embodiment) of change in one direction (positive or negative or flat). The event identification module 114 reviews the streak duration attribute to see if the values of the measurement data have been changing in an abnormally consistent way over the past X time periods.

The event identification module 114 sets a probability threshold in the INCDF. For purposes of illustration and not limitation, there may be a lower threshold such that any measurement below 2.5% probability is abnormal and there may be an upper threshold such that any measurement above 97.5% probability is abnormal. Thresholds of below 5% probability and above 95% probability may also be possible, for example. These thresholds are based on the historical distribution of the measurement data.

The user may define which measurements set off an alarm. It may be that only measurements exceeding the upper threshold set off an alarm or measurements exceeding the lower threshold set off an alarm or it may be that measurements exceeding both the upper threshold and the lower threshold set off an alarm.

Those measurements that have set off an alarm in the event identification module are passed to the decision tree manager 126 which contains the decision tree 116. While the measurements abstracted by the monitoring manager 118 have been reduced to a much lower number of measurements which have set off alarms, there are still too many measurements for a user to deal with on an hourly or daily basis.

The decision tree 116 takes the alarmed data from the event identification module 114 and decides which alarms are significant (News), which alarms are not significant (not News). The decision tree manager 126 passes the most newsworthy to the page one rendering 136. The user may select how many event notifications may be passed from the decision tree 116 by the decision tree manager 126 to the page one rendering 136 which presents the event notifications to the user as the page one format 112. Page one format 112 may typically be rendered as a summarized email or text message, but it may be a report or event dashboard.

It is most preferred that the decision tree 116 goes through decision tree training 128. The decision tree training determines the value of event alarms from the event identification module 114. The training module 130 handles the training of the decision tree 116 based on feedback from the feedback manager 132. The feedback manager 132 provides an interface for the user to input the feedback for training.

Training data may be obtained from users by providing unfiltered alarms for each measurement period through the feedback manager 132 for the four attributes described previously. The users may respond with indications for each alarm for each attribute that the alarm was newsworthy, yes or no, and the user's disposition of the newsworthy alarms as good, bad or other.

The procedure for training by the training module 132 proceeds in the following manner.

1. Create a root node. The first step of model training is creating a root node starting with the full set of historical data for this measurement. Included are the numbers for each of the four attributes, along with a label that says whether or not the measurement was newsworthy on that day. The model is being trained here so this is not about whether or not today's measurement is News, it's about what combination of attribute numbers for each measure indicate newsworthiness most reliably.

2. Termination conditions. For a node, the following three conditions are used to determine whether the node should stop splitting. (a) If the node is a pure node such that most of the feedback is of the same class (Y or N)), stop splitting. (b) If the node size (sample number in this node) is less than or equal to one, stop splitting. (c) If the depth of the tree is more than thirty, stop splitting.

3. Find value to split on in each of the four attributes. Find a splitting point of an attribute which makes the subset most different. Divide the data set into subsets and determine the probability ratio of true news and none news at each subset. Find where the probability ratio reaches a maximum and choose that as the split point for each of the attributes.

4. Choose an attribute which gives the best information gain. Compare four attributes and choose the one having best information gain in terms of entropy reduction as a split node. Compare the probability ratio of the four attributes in step 3, choose the maximum one to be the split node.

5. Split root node with split point determined at step 4 and add new node (node1 and node2) to decision tree.

6. For each node (node1 and node2), repeat steps 2 to step 5. The model training finishes when all the nodes terminate splitting.

The decision tree 116 may be periodically retrained when there is new training data. New training data may be, for example, false positives or false negatives. When there are false positives (the decision tree 116 predicted it was news but the user of the system says it isn't) or false negatives (the decision tree 116 predicted it wasn't news but the user of the system says it is), the false positives and false negatives are added to the training set and the model is retrained. "Retraining" the model means re-running the process above, but including the new feedback, with the result that the combination of numbers and attributes will be adjusted with the intention of being more accurate in its predictions.

Once the decision tree 116 has been trained, new event identification data may be run through the decision tree 116 to get a prediction that the measurement is newsworthy. Since the decision tree 116 has been trained based on historical data and what is news versus what is not news, the decision tree 116 is able to process new event identification and indicate whether the new event is news or not news.

When measurements are set up with the thresholds, metadata may be added such that a measurement exceeding one threshold creating an alarm, for example, the upper threshold may be classified as "bad" while a measurement exceeding the other threshold creating an alarm, for example, the lower threshold may be classified as "good". The reverse may be true for measurements in other scenarios. Thus, when the measurement data from the event identification module 114 is run through the trained decision tree 116, the decision tree 116 predicts whether the "bad' measurement exceeding its respective threshold is newsworthy to become bad news for the page one format 112. Similarly, the decision tree 116 also predicts whether the "good" measurement exceeding its respective threshold is newsworthy to become good news for the page one format 112.

The exemplary embodiment 124 also has the option to predict whether an unusual or odd series of events have occurred which may be news but not good news or bad news. If the event is significant but it is not good news or bad news, it may be other news that may be presented to the user. One example may be the stock trading example earlier where the volume of trading may be significant (i.e., news) but neither good nor bad—just news. Another example of this kind of thing is where so many of certain types of events happened during a measurement period or over a series of measurement periods where such an occurrence would be unusual. The decision tree 116 may output these kinds of events as "other news".

EXAMPLE

The example here pertains to a scan of a computing system which probes for security vulnerabilities. The scans are expected to fail a certain percentage of the time, but the user would want to know if there is a big surge.

The key question to answer with Page One is, what should the alarm threshold be? The user does not want to be alarmed every time the scan fails as it may fail tens or hundreds times a day and the user does not want to set some static number because there are many different alarms to set and the alarm threshold can vary over time which may present a maintenance nightmare.

So the measurement is registered with Page One format by adding meta data that provides basic information about the measure including how to actually take the measurement. Page One format takes care of the rest. The meta data may include, for example:

---
ID: 1132
Name: "Failed Security Scans - past 36 hours"
What is the thing being measured: "Scans"
Categories: ["Dataflow", "IT Security"]
Dispositions: {"Positive": "Bad", "Negative": "Good"}
Offset (if the measure is of something that happened x days before): 0
---

After a period of time, there will be historical data that will describe what is "normal" for this measure, in terms of the four attributes:

1. Value (Raw number)
2. Change from previous day
3. Streak Duration: Number of consecutive days in the same direction
4. Streak Size: Change in raw number over the streak's duration (streak impact)

Now, on any given day, the user can tell if the measurement is "alarming". The INCDF informs the user of the probability of observing a given number, based on history.

A Page One format in this example was received and had an item of "bad news" about the measure called "Failed Security Scans—past 36 hours". The bad news is illustrated in FIG. 6. Looking at the graph, it can be seen that there were actually three reasons this security scan was considered newsworthy:

The measure of 1107 was very high
The change of 985 from yesterday was very high
The streak impact was very high The Page One format may automatically generate the table shown in FIG. 6. A "Positive" change is a bad thing according to the meta data detailed above—so the positive change of 985 is bad news.

Figure 7:
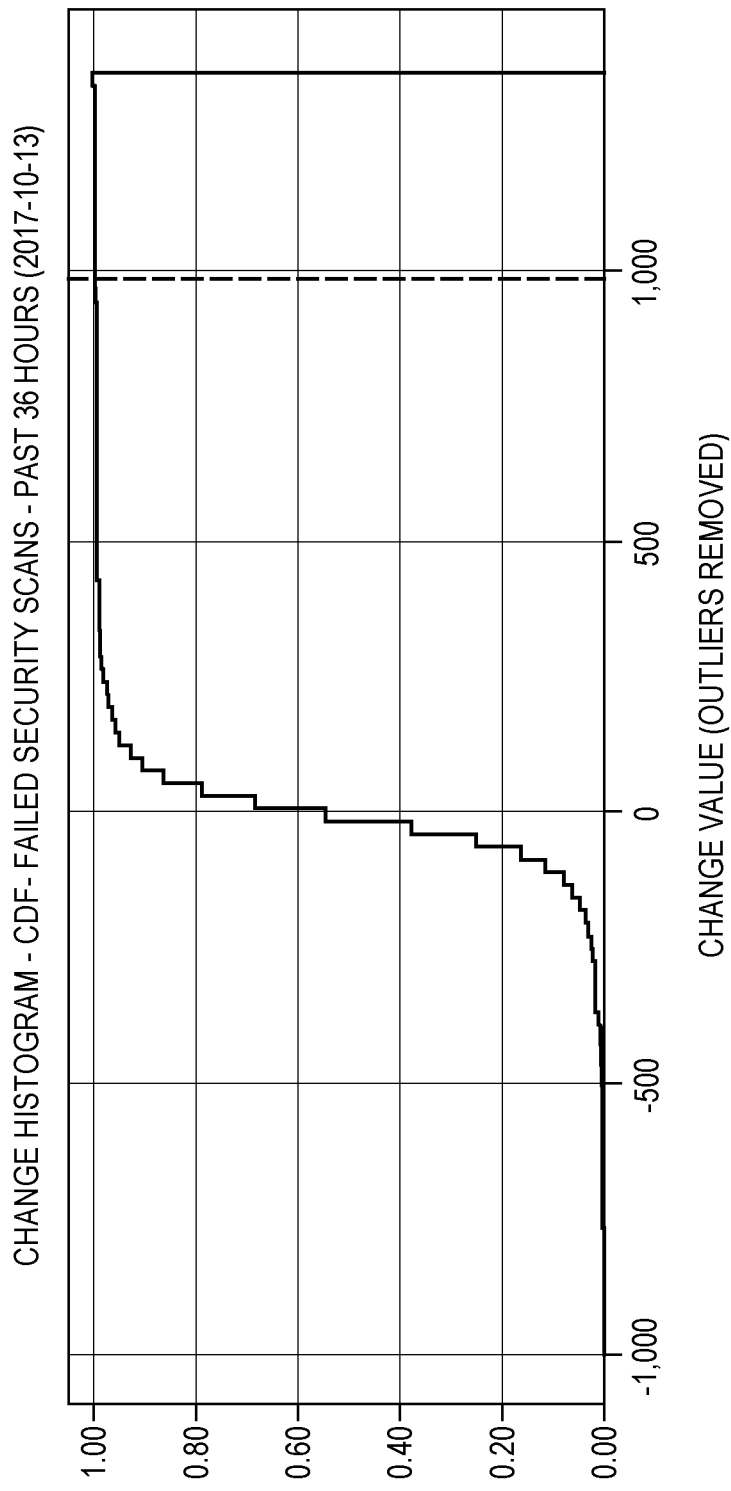
FIG. 7 illustrates a cumulative distribution function for a change histogram for the security scan of FIG. 6.

FIG. 7 illustrates a cumulative distribution function for a change histogram for the security scan and shows the probability of observing the present change value of 985, indicated by the dotted vertical line. If that probability is lower than 2.5% or higher than 97.5%, then the alarm is triggered. The key here is that a static raw number is not set as the threshold. This means that the data itself determines what the threshold should be, and it will change as the data changes.

The last change value that was observed was 985. Where the dotted vertical line intersects the change histogram indicates the probability of observing this change is less than 1%. Technically, what this shows is the probability of seeing less than 985 is 99% or so and thus the change value of 985 is significant.

Figure 8:
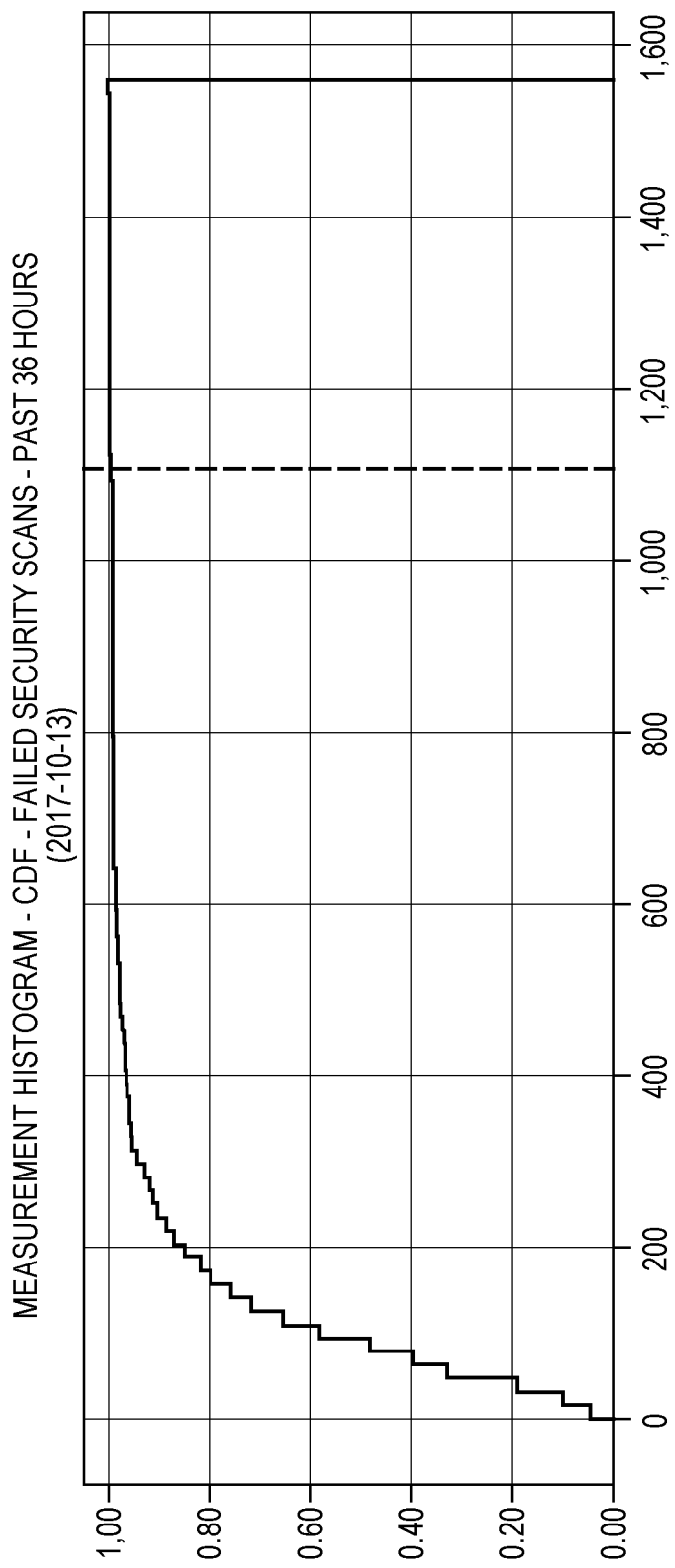
FIG. 8 illustrates the cumulative distribution function for a measurement histogram for the security scan of FIG. 6.

FIG. 8 illustrates the cumulative distribution function for a measurement histogram for the security scan and shows the probability of observing the present measurement value of 1107. The vertical dotted line shows the measure, and the probability of observing it. Technically, the probability of seeing less 1107 is greater than 99% and thus the value of 1107 is significant.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for event identification comprising:
receiving event information pertaining to events occurring with respect to a cloud computing environment over a network, each occurring event having a measurement metric, the measurement metric for each occurring event including a value attribute, a change attribute, a streak size attribute and a streak duration attribute wherein the value attribute is the original series of measurement data over one or more measurement periods, the change attribute is the change of value at a current measurement period relative to a previous measurement period, the streak size attribute is the size of continuous change in one direction as positive, negative or flat and the streak duration attribute is the number of measurement periods of continuous change in one direction as positive, negative or flat;
evaluating by a probability function the measurement metric for each occurring event to determine when any of the value attribute, the change attribute, the streak size attribute and the streak duration attribute is above a predetermined probability threshold or below the probability threshold, wherein the probability threshold is dynamically determined based on a historical distribution of measurement metric data, and wherein above the probability threshold or below the probability threshold is classified as alarm data;
training a decision tree by a training process using training data comprising:
obtaining the training data, wherein the training data includes a plurality of event information that triggers an alarm regardless of whether the alarm is above the predetermined probability threshold or below the probability threshold, the plurality of event information that triggers the alarm having an indication of whether the event information that triggered the alarm was a significant alarmed event;
creating a root node using the training data;
finding a splitting point of the value attribute, the change attribute, the streak size attribute and the streak duration attribute by determining a probability ratio of the significant alarmed event and an insignificant alarmed event for a subset of the value attribute, the change attribute, the streak size attribute and the streak duration attribute;
comparing the probability ratio of the value attribute, the change attribute, the streak size attribute and the streak duration attribute and choosing an attribute from the compared attributes as a split node that results in a maximum probability ratio between the significant alarmed event and the insignificant alarmed event;
splitting the root node using the chosen attribute as the split node and new node to the decision tree; and
repeating finding the splitting point, comparing the probability ratio, and splitting the splitting node until all nodes terminate splitting;
processing the alarm data through the decision tree after the training process has been performed to determine based on the training data when the alarm data is significant or when the alarm data is not significant and to reduce the number of alarm data to a predetermined number of significant alarm data, wherein the alarm data that is classified as significant requires attention;
displaying the predetermined number of significant alarm data to a user;
retraining the decision tree with a second set of training data based on feedback received from the user; and
adjusting the probability threshold based in part on the second set of training data.

2. The method of claim 1 wherein processing the alarm data through the decision tree to determine when the alarm data is significant or when the alarm data is not significant further to determine when the alarm data is not significant but the alarm data is unusual in that an odd pattern of data emerges.

3. A computer program product for event identification, the computer program product comprising a computer readable storage medium having program instructions embodied therewith, the program instructions executable by a processor to cause the processor to perform a method comprising:
receiving event information pertaining to events occurring with respect to a cloud computing environment over a network, each occurring event having a measurement metric, the measurement metric for each occurring event including a value attribute, a change attribute, a streak size attribute and a streak duration attribute wherein the value attribute is the original series of measurement data over one or more measurement periods, the change attribute is the change of value at a current measurement period relative to a previous measurement period, the streak size attribute is the size of continuous change in one direction as positive, negative or flat and the streak duration attribute is the number of measurement periods of continuous change in one direction as positive, negative or flat;
evaluating by a probability function the measurement metric for each occurring event to determine when any of the value attribute, the change attribute, the streak size attribute and the streak duration attribute is above a predetermined probability threshold or below the probability threshold, wherein the probability threshold is dynamically determined based on a historical distribution of measurement metric data, and wherein above the probability threshold or below the probability threshold is classified as alarm data;
training a decision tree by a training process using training data comprising:
obtaining the training data, wherein the training data includes a plurality of event information that triggers an alarm regardless of whether the alarm is above the predetermined probability threshold or below the probability threshold, the plurality of event information that triggers the alarm having an indication of whether the event information that triggered the alarm was a significant alarmed event;
creating a root node using the training data;
finding a splitting point of the value attribute, the change attribute, the streak size attribute and the streak duration attribute by determining a probability ratio of the significant alarmed event and an insignificant alarmed event for a subset of the value attribute, the change attribute, the streak size attribute and the streak duration attribute;
comparing the probability ratio of the value attribute, the change attribute, the streak size attribute and the streak duration attribute and choosing an attribute from the compared attributes as a split node that results in a maximum probability ratio between the significant alarmed event and the insignificant alarmed event;
splitting the root node using the chosen attribute as the split node and new node to the decision tree; and
repeating finding the splitting point, comparing the probability ratio, and splitting the splitting node until all nodes terminate splitting;
processing the alarm data through the decision tree after the training process has been performed to determine based on the training data when the alarm data is significant or when the e alarm data is not significant and to reduce the number of alarm data to a predetermined number of significant alarm data, wherein the alarm data that is classified as significant requires attention;
displaying the predetermined number of significant alarm data to a user;
retraining the decision tree with a second set of training data based on feedback received from the user; and
adjusting the probability threshold based in part on the second set of training data.

4. The computer program product of claim 3 wherein processing the alarm data through the decision tree to determine when the alarm data is significant or when the alarm data is not significant includes a probability that the alarm data is significant or that the alarm data is not significant.

5. The computer program product of claim 3 wherein processing the alarm data through the decision tree to determine when the alarm data is significant or when the alarm data is not significant further to determine when the alarm data is not significant but the alarm data is unusual in that an odd pattern of data emerges.

6. A system for event identification comprising:
an event identification module;
a decision tree manager;
a non-transitory storage medium that stores instructions; and
a processor that executes the instructions to perform the following functions:
receive by the event identification module event information pertaining to events occurring with respect to a cloud computing environment over a network, each occurring event having a measurement metric, the measurement metric for each occurring event including a value attribute, a change attribute, a streak size attribute and a streak duration attribute wherein the value attribute is the original series of measurement data over one or more measurement periods, the change attribute is the change of value at a current measurement period relative to a previous measurement period, the streak size attribute is the size of continuous change in one direction as positive, negative or flat and the streak duration attribute is the number of measurement periods of continuous change in one direction as positive, negative or flat;
evaluate by a probability function in the event identification module the measurement metric for each occurring event to determine when any of the value attribute, the change attribute, the streak size attribute and the streak duration attribute is above a predetermined probability threshold or below a probability threshold, wherein the probability threshold is dynamically determined based on a historical distribution of measurement metric data, and wherein above the probability threshold or below the probability threshold is classified as alarm data;
train a decision tree by a training process using training data, the training process comprising functions to:
obtain the training data, wherein the training data includes a plurality of event information that triggers an alarm regardless of whether the alarm is above the predetermined probability threshold or below the probability threshold, the plurality of event information that triggers the alarm having an indication of whether the event information that triggered the alarm was a significant alarmed event;
create a root node using the training data;
find a splitting point of the value attribute, the change attribute, the streak size attribute and the streak duration attribute by determining a probability ratio of the significant alarmed event and an insignificant alarmed event for a subset of the value attribute, the change attribute, the streak size attribute and the streak duration attribute;
compare the probability ratio of the value attribute, the change attribute, the streak size attribute and the streak duration attribute and choosing an attribute from the compared attributes as a split node that results in a maximum probability ratio between the significant alarmed event and the insignificant alarmed event;
split the root node using the chosen attribute as the split node and new node to the decision tree; and
repeat finding the splitting point, comparing the probability ratio, and splitting the splitting node until all nodes terminate splitting;
process the alarm data through the decision tree after the training process has been performed to determine based on the training data when the alarm data is significant or when the alarm data is not significant and to reduce the number of alarm data to a predetermined number of significant alarm data, wherein the alarm data that is classified as significant requires attention;
display the predetermined number of significant alarm data to a user;
retrain the decision tree with a second set of training data based on feedback received from the user; and
adjust the probability threshold based in part on the second set of training data.

7. The method of claim 1, wherein the reducing the number of alarm data to the predetermined number of significant alarm data comprises classifying a first set of significant alarm data, a second set of significant alarm data, and a third set of significant alarm data.

8. The method of claim 7, wherein the first set of significant alarm data is classified as good news, the second set of significant alarm data is classified as bad news, and the third set of significant alarm data is classified as other news, and wherein displaying the predetermined number of significant alarm data to the user includes displaying the classification of each of the sets of significant alarm data.

9. The method of claim 8, wherein the first set of significant alarm data that is classified as good news exceeds a first threshold, wherein the second set of significant alarm data that is classified as bad news exceeds a second threshold, and wherein the third set of significant alarm data that classified as other news does not exceed either the first threshold or the second threshold.

10. The method of claim 1, wherein the feedback received from the user indicates that at least one of the predetermined number of significant alarm data was classified incorrectly by the decision tree.

11. The method of claim 1, wherein the probability function is an inverse cumulative distribution function (IN-CDF).

12. The method of claim 1, wherein the event information includes metadata comprising a disposition associated with each measurement metric.

13. The method of claim 12, wherein the disposition indicates that a positive change in a first measurement metric is considered bad and a negative change in the first measurement metric is considered good.

14. The method of claim 8, wherein displaying the classification of each of the sets of significant alarm data is summarized on a one page format.

15. The method of claim 1, wherein the event information is received from a plurality of data sources over the network.

16. The method of claim 15, wherein one or more data source of the plurality of data sources is selected from a group of data sources consisting of: a report; a dashboard; an email; an instant message; and a trouble ticket.

17. The method of claim 1, wherein the measurement metric of each occurring event is chosen from a group of measurement metrics consisting of:
- an amount of network traffic associated with the cloud computing environment;
- an amount of RAM allocated to a computing system of the cloud computing environment;
- an amount of active virtual machines in the cloud computing environment;
- an amount of failed log-in attempts associated with the cloud computing environment; and
- an amount of computing system crashes associated with the cloud computing environment.

* * * * *